United States Patent
Iwashita

(10) Patent No.: US 8,983,262 B2
(45) Date of Patent: Mar. 17, 2015

(54) INFORMATION RECORDING APPARATUS AND CONTROLLING METHOD THEREOF

(75) Inventor: Koji Iwashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/458,032

(22) Filed: Apr. 27, 2012

(65) Prior Publication Data

US 2012/0288252 A1  Nov. 15, 2012

(30) Foreign Application Priority Data

May 10, 2011  (JP) ................. 2011-105646
Jul. 26, 2011  (JP) ................. 2011-163686

(51) Int. Cl.
*H04N 5/77* (2006.01)
*H04N 5/225* (2006.01)
(Continued)

(52) U.S. Cl.
CPC .............. *H04N 5/772* (2013.01); *G11B 27/034* (2013.01); *G11B 27/11* (2013.01); *H04N 5/907* (2013.01); *H04N 21/4184* (2013.01); *H04N 21/4223* (2013.01); *H04N 21/4334* (2013.01);
(Continued)

(58) Field of Classification Search
CPC .......... H04N 5/76; H04N 5/77; H04N 5/775; H04N 7/00; H04H 5/225
USPC ....... 386/224, 230; 348/118, E7.086, 207.99, 348/231.99, 207.1, 207.11, 552, E5.04; G9B/27.052; 455/66.1; 707/205; 375/338, 339
See application file for complete search history.

(56) References Cited

U.S. PATENT DOCUMENTS 6,625,627 B2 *  9/2003  Haneda ................................. 1/1
7,310,112 B1 *  12/2007  Watanabe .................. 348/207.1
(Continued)

FOREIGN PATENT DOCUMENTS

JP  2005-136794  5/2005
JP  2007-174693  7/2007
(Continued)

OTHER PUBLICATIONS

The above foreign patent documents were cited in the May 2, 2014 Korean Office Action, which is enclosed without an English Translation, that issued in Korean Patent Application No. 10-2012-0049016.

(Continued)

*Primary Examiner* — Thai Tran
*Assistant Examiner* — Syed Hasan
(74) *Attorney, Agent, or Firm* — Cowan, Liebowitz & Latman, P.C.

(57) ABSTRACT

The invention relates to an information recording apparatus capable of relay recording, during which a sequence of data is continuously recorded across a plurality of recording media, as well as to a controlling method thereof. If the relay recording mode is set, it is determined whether any medium having a wireless communication function is present among the recordable recording media. If a recording medium having a wireless communication function is present, data transfer utilizing the wireless communication function is inactivated. This enables relay recording that accounts for cases in which memory cards provided with a wireless communication function are included among the recording media.

10 Claims, 11 Drawing Sheets

(51) Int. Cl.
*H04N 5/76* (2006.01)
*H04N 5/775* (2006.01)
*H04N 7/00* (2011.01)
*G11B 27/034* (2006.01)
*G11B 27/11* (2006.01)
*H04N 5/907* (2006.01)
*H04N 21/418* (2011.01)
*H04N 21/4223* (2011.01)
*H04N 21/433* (2011.01)
*H04N 21/4363* (2011.01)
*G11B 20/10* (2006.01)
*H04N 5/765* (2006.01)

(52) U.S. Cl.
CPC .... *H04N21/43637* (2013.01); *G11B 20/10527* (2013.01); *G11B 2220/41* (2013.01); *H04N 5/765* (2013.01); *G11B 2020/10537* (2013.01); *G11B 2020/10944* (2013.01)
USPC ........ 386/224; 386/230; 348/118; 348/207.1; 348/207.11; 348/207.99; 348/231.99

(56) References Cited

U.S. PATENT DOCUMENTS

| | | | |
|---|---|---|---|
| 8,411,152 B2* | 4/2013 | Kaibara | 348/207.99 |
| 8,660,400 B2* | 2/2014 | Nosaka et al. | 386/224 |
| 2003/0081934 A1* | 5/2003 | Kirmuss | 386/46 |
| 2010/0003017 A1 | 1/2010 | Nosaka et al. | |

FOREIGN PATENT DOCUMENTS

| | | |
|---|---|---|
| JP | 2007-214768 A | 8/2007 |
| JP | 2010-252054 A | 4/2010 |

OTHER PUBLICATIONS

The above foreign patent documents were cited in a Sep. 23, 2014 Chinese Office Action, which is enclosed with an English Translation, that issued in Chinese Patent Application No. 201210144514.5.

* cited by examiner

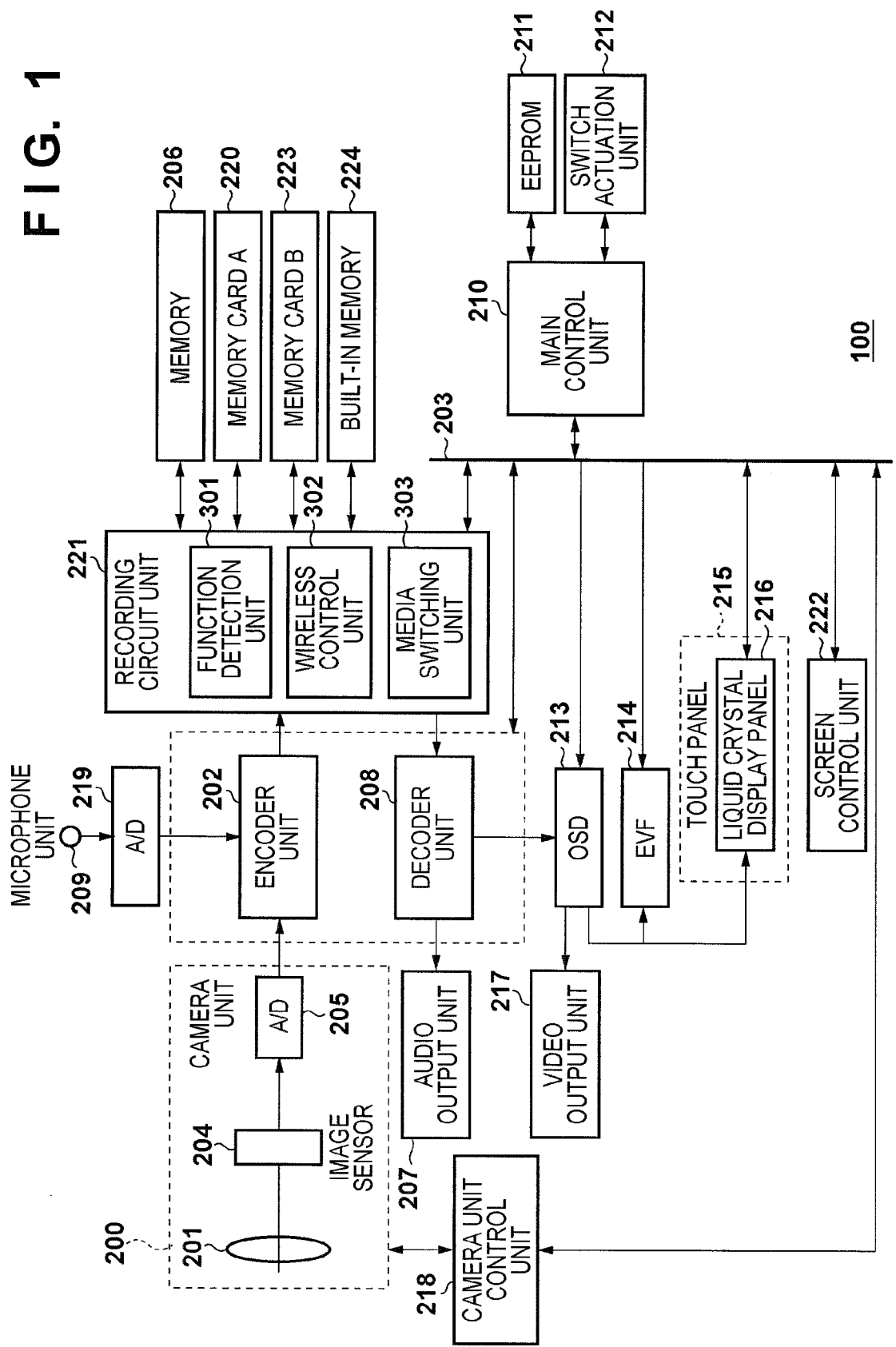

FIG. 2A
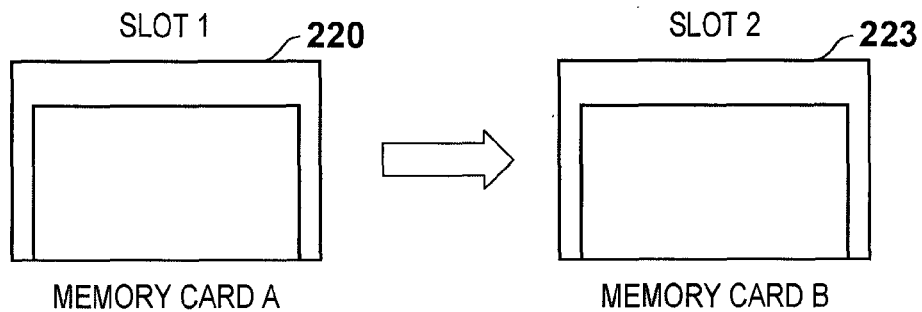
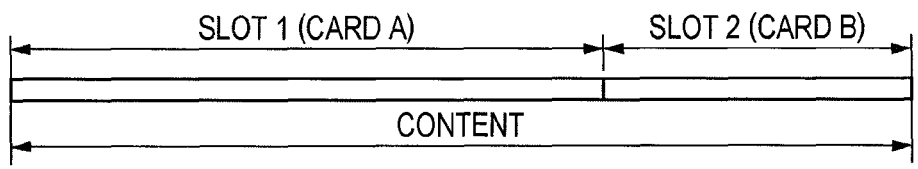
FIG. 2B
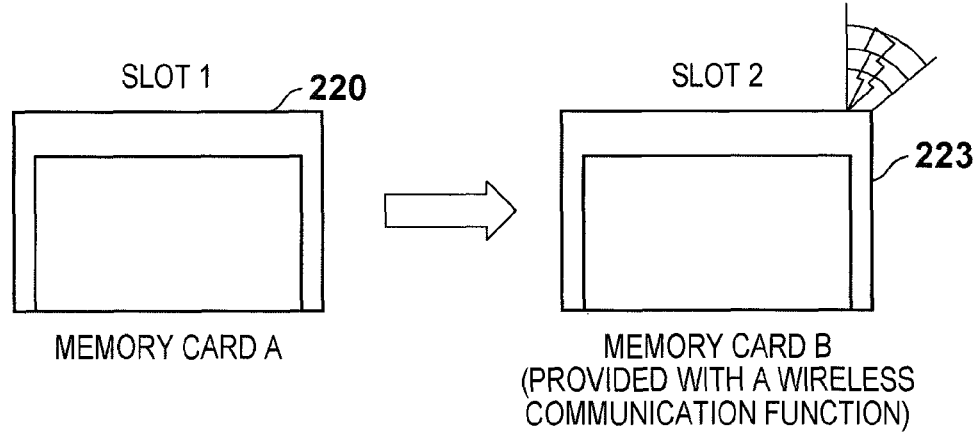
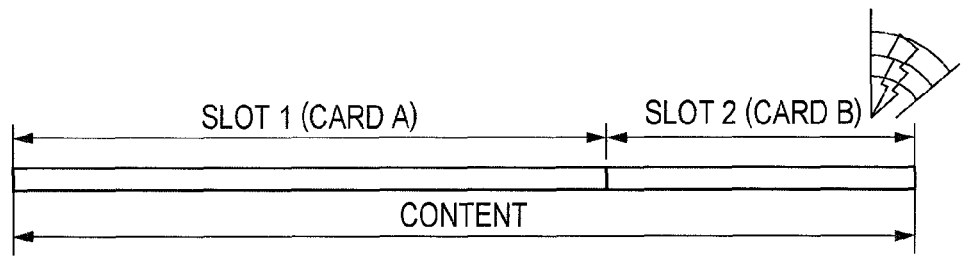

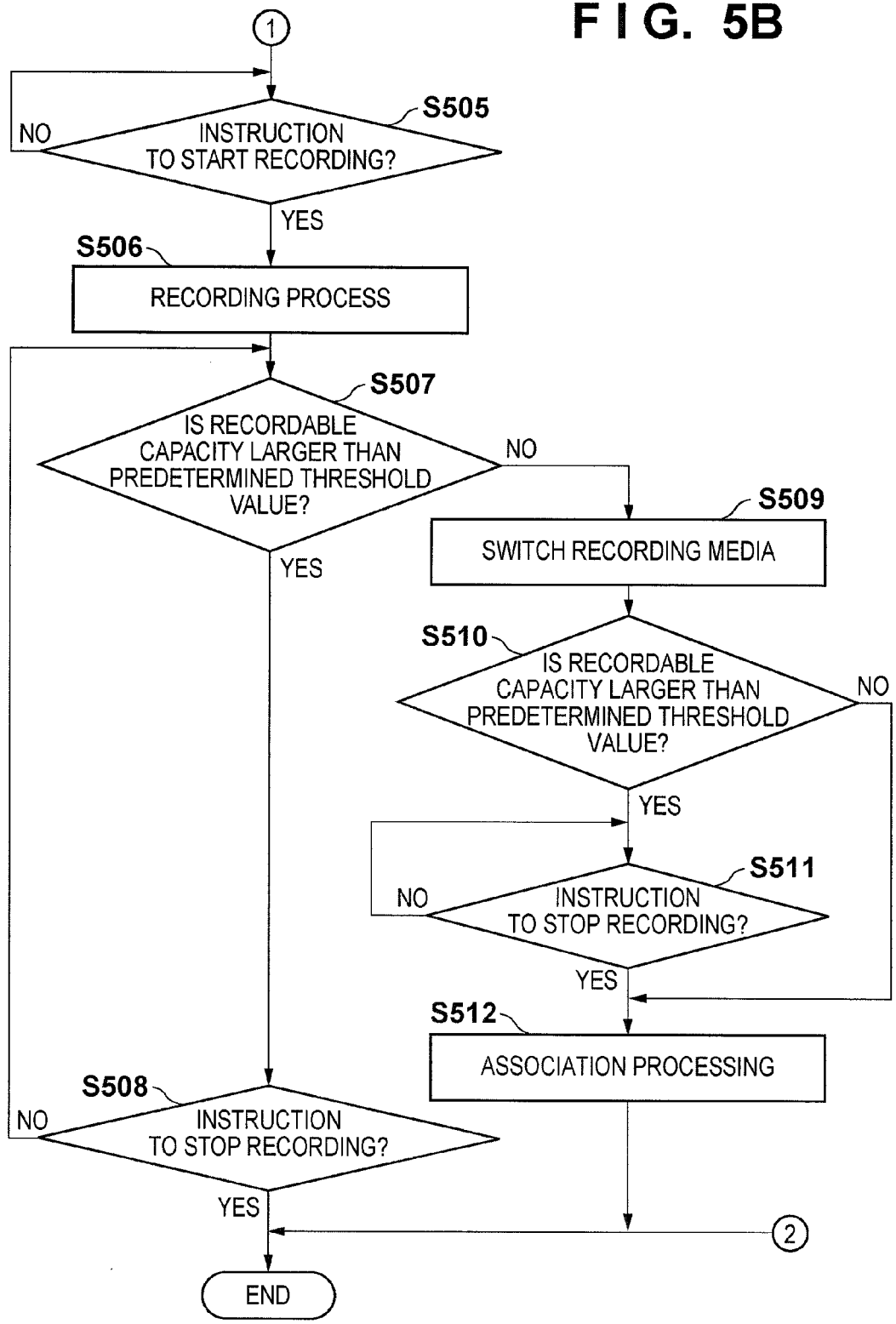

INFORMATION RECORDING APPARATUS AND CONTROLLING METHOD THEREOF

BACKGROUND OF THE INVENTION

1. Field of the Invention

The present invention relates to an information recording apparatus that records information such as, for example, images and sound, as well as to a controlling method thereof, and, in particular, relates to an information recording apparatus capable of continuous recording on multiple recording media and a controlling method thereof.

2. Description of the Related Art

Information recording apparatuses capable of using multiple recording media, such as, for example, digital cameras, video cameras, and the like, have become well-known in recent years. The multiple recording media can be exemplified, for instance, by multiple built-in recording media, built-in recording media along with removable recording media, multiple removable recording media, etc.

Among them, media widely used as removable recording media are semiconductor memory cards, which are known to have various specifications and capacities. Also known are information recording apparatuses having multiple card slots corresponding to semiconductor memory cards of different specifications.

Relay recording, during which a sequence of data, such as video, is continuously recorded across multiple recording media (Japanese Patent Laid-Open No. 2005-136794 and Japanese Patent Laid-Open No. 2007-174693), is known as an example of the functionality inherent in information recording apparatuses capable of using multiple recording media.

In recent years, cards having a wireless communication function (wireless memory cards) have become well-known among the semiconductor memory cards that can be used by information recording apparatuses. However, absolutely no studies have been conducted into the issue of how to perform relay recording when wireless memory cards are included in the multiple installed recording media.

SUMMARY OF THE INVENTION

The present invention was made by taking such prior-art problems into consideration. Namely, the present invention, which is an information recording apparatus capable of relay recording involving continuously recording a sequence of data across multiple recording media, and a controlling method thereof, enables relay recording that accounts for cases in which memory cards provided with a wireless communication function are included among the recording media.

According to an aspect of the present invention, there is provided an information recording apparatus having a relay recording mode in which a sequence of data is continuously recorded across a plurality of recording media, comprising: an identification unit that identifies a recording medium having a wireless communication function among recordable recording media; a wireless control unit that controls the wireless communication function of the recording medium having a wireless communication function; and a main control unit that controls the wireless control unit, in the case that the relay recording mode is set, to inactivate data transfer utilizing the wireless communication function for the recording medium having a wireless communication function determined by the identification unit.

According to another aspect of the present invention, there is provided an information recording apparatus capable of relay recording in which a sequence of data is continuously recorded across a plurality of recording media, the information recording apparatus comprising: an identification unit that identifies a recording medium having a wireless communication function among recordable recording media; a setting unit that sets a recording order used in relay recording on the recordable recording media; and a recording unit that performs relay recording by switching a destination recording media for recording in accordance with the recording order set by the setting unit; wherein the setting unit sets the recording order such that a recording medium that does not have a wireless communication function is selected as the destination medium for recording with precedence among the recordable recording media.

Further features of the present invention will become apparent from the following description of embodiments with reference to the attached drawings.

BRIEF DESCRIPTION OF THE DRAWINGS

FIG. 1 is a block diagram illustrating a configuration of a digital video camera serving as an example of the information recording apparatus used in Embodiment 1 of the present invention.

FIG. 2A and FIG. 2B are schematic diagrams used to describe relay recording.

FIGS. 5A and 5B are flowcharts used to describe the operation of recording performed in the digital video camera used in Embodiment 2 of the present invention.

DESCRIPTION OF THE EMBODIMENTS

Figure 3:
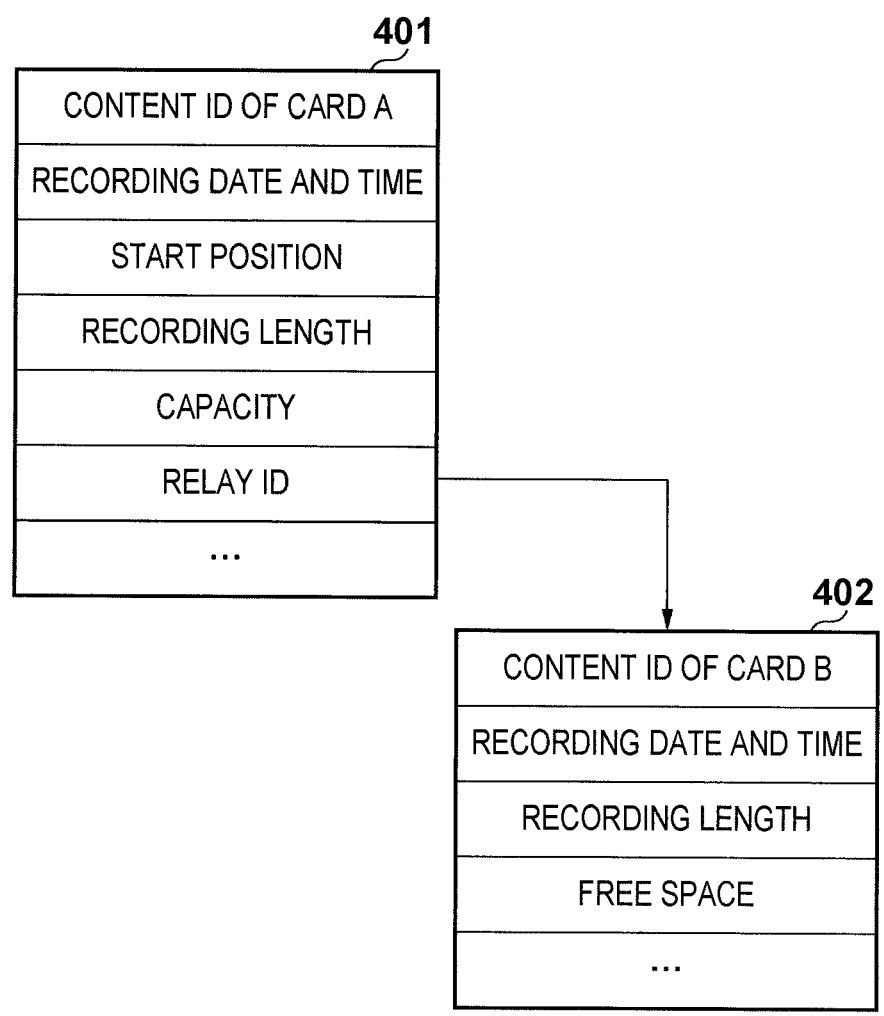
FIG. 3 is a diagram illustrating an example of management information utilized when relay recording is performed in the digital video camera used in the embodiments of the present invention.

Embodiments of the present invention will now be described in detail in accordance with the accompanying drawings.

(Embodiment 1)

The embodiments below describe video data as an example of a data sequence and a digital video camera as an example of a relay recording-enabled information recording apparatus. However, data sequences in the present invention are not limited to video data and information recording apparatuses are not limited to digital video cameras.

FIG. 1 is a block diagram illustrating a configuration of a digital video camera 100 serving as an example of the information recording apparatus used in Embodiment 1 of the present invention. The lens unit 201 has a stationary lens group, a zoom lens group, a stop, and a corrector lens group. The corrector lens group possesses a focusing capability, as well as the capability to correct an imaging position displaced due to the movement of the zoom lens group. An image sensor 204, which is, for instance, a CCD (Charge Coupled Device), generates an imaging signal by transforming a subject image formed by the lens unit 201 in an imaging plane into an electrical signal for pixel units. An A/D processing unit 205 carries out predetermined processing on the imaging signal and outputs digital image data. It should be noted that the lens unit 201, image sensor 204, and A/D processing unit 205 constitute a camera unit 200. In addition, the camera unit 200 also has an actuator used for driving the zoom lens group of the lens unit 201, the stop, and the like, a sensor for anti-shake compensation (e.g., an angular velocity sensor), and an optical anti-shake compensation mechanism (shift lenses, etc.), all of which are not shown in FIG. 1.

A camera unit control unit 218 controls the operation of each element of the camera unit 200 under the control of the main control unit 210. In addition, information obtained from the camera unit 200, such as, for instance, focus information, hand jitter information, and the like is transmitted to the main control unit 210. A microphone unit 209 detects ambient sounds during imaging. The microphone unit 209 includes an amplifier and a bandpass-limiting circuit. The A/D processing unit 219 receives an analog audio signal outputted by the microphone unit 209 and outputs digital audio data.

The main control unit 210 is, for instance, a micro-computer that controls the entire digital video camera 100. The main control unit 210 has at least a non-volatile memory (ROM) that stores software programs, a volatile memory (RAM) that serves as a work space, an external bus that is used for passing data to and from other hardware and for accessing control registers, and a timer that measures time. The bus 203 is a transmission path used for passing data between interconnected blocks under the control of the main control unit 210.

An encoder unit 202 encodes the digital image data and digital audio data obtained from the A/D processing units 205 and 219 in MPEG (Moving Picture Experts Group) 2 format, etc. under the control of the main control unit 210. Furthermore, the encoder unit 202 multiplexes the data encoded in MPEG2 format in a time series and generates compressed video data. In addition, the encoder unit 202 is provided with a capability of communicating information etc. that is necessary, for example, for the conversion of data locations and frame positions to the main control unit 210.

A recording circuit unit 221, which has an interface to the encoder unit 202, a memory 206, a memory card A 220, a memory card B 223, a built-in memory 224, and a decoder unit 208, controls the passage of data under the control of the main control unit 210. The memory 206 is a storage area that can be used for operation by each block. It will be noted that the built-in memory 224 is used starting from Embodiment 3 and is not essential for the digital video camera 100 of Embodiments 1 and 2.

The function detection unit 301 of the recording circuit unit 221 refers to memory card IDs assigned to each card in order to identify whether any of the memory card A 220 and memory card B 223 (and, if necessary, the built-in memory 224) has a wireless communication function. The function detection unit 301 executes determination processing when, for example, the digital video camera 100 is powered on, or when a memory card is inserted or removed. It should be noted that the function detection unit 301 may identify the presence or absence of a wireless communication function in the built-in memory 224. In such a case, the function detection unit 301 may identify the presence or absence of a wireless communication function in the built-in memory 224 without using a memory card ID. For example, the function detection unit 301 can identify the presence or absence of a wireless communication function depending on whether the wireless communication function of the digital video camera 100 has been activated or not.

A wireless control unit 302 exercises control over the wireless communication functions of the memory cards and, more specifically, exercises power supply control over the wireless transmission units in the memory cards and transmission control over the video data stored on the memory cards. A media switching unit 303 switches the recording media that are intended for recording video data. During relay recording, which involves continuously recording a sequence of data across multiple recording media, the media switching unit 303 switches recording media intended for recording based on a set recording order when the amount of recording space remaining on the recording medium undergoing recording drops below a predetermined threshold value. It should be noted that the function detection unit 301, wireless control unit 302, and media switching unit 303 may be either separate hardware units, or, alternatively, two or more of them may be implemented as a single hardware unit. In addition, their functions may be carried out by the main control unit 210.

It will be noted that the digital video camera 100 is provided with a menu for setting the active/inactive status of the wireless communication function of the recording media having a wireless communication function. Once the wireless communication function is enabled via user menu actions and the like, the wireless control unit 302 exercises control such that power is supplied to the wireless communication unit in the memory card. In addition, once the wireless communication function has been inactivated, the wireless control unit 302 exercises control such that the supply of power to the wireless communication unit in the memory card is stopped. This setting is held in the EEPROM 211.

The memory card A 220 and memory card B 223 represent an example of recording media that can be used for recording captured video. The recording circuit unit 221 has an interface to the memory 206, memory card A 220, memory card B 223, built-in memory 224, and bus 203. In addition, the recording circuit unit 221 performs conversion required for access from the main control unit 210 etc. to the control registers of the memory card A 220 and memory card B 223.

Video data containing images captured by the camera unit 200 and audio recorded by the microphone unit 209 is recorded on the memory card A 220 and memory card B 223, as well as in the built-in memory 224. It should be noted that the memory card A 220, memory card B 223, and built-in memory 224 have interfaces that can be connected to the recording circuit unit 221 and are equipped with circuitry used to read/write data in the semiconductor memories they themselves have. The recording circuit unit 221 of the present embodiment has a so-called direct memory access (DMA) feature. Thus, if a data volume and a readout start address in the memory 206, along with write start addresses on the memory card A 220, memory card B 223, and in the built-in memory 224, are specified in the recording circuit unit 221, an automatic transfer of data takes place. The same applies to reading from recording media to the memory 206.

The decoder unit 208 sequentially reads out compressed video data and compressed still picture data from the addresses of the memory 206 specified by the main control unit 210. The decoder unit 208 converts the compressed video data and compressed still images that have been read to ITU-R BT.656 (CCIR656) digital video signals and digital audio signals and then outputs them. If necessary, the decoder unit 208 performs reduction processing during the playback of the compressed still image data.

The digital video signals and digital audio signals obtained as a result of conversion by the decoder unit 208 are converted to analog signals by the video output unit 217 and audio output unit 207 for the purpose of output to external equipment. For example, the video output unit 217 and audio output unit 207 are connected to a TV receiver and the like.

An onscreen display (OSD) unit 213 superimposes a menu screen used to specify various settings, as well as titles, time, and other information on the digital video signal outputted by the decoder unit 208 and outputs it to the video output unit 217. In addition, the OSD unit 213 possesses a capability of capturing the digital video signal input from the decoder unit 208, subjecting it to reduction processing, and superimposing it on any location of the picture corresponding to the digital video signal.

A switch actuation unit 212, which is a group of input devices, is employed by the user in order to operate the digital video camera 100. The input devices are not limited to switches. The main control unit 210 determines the contents of the entries made by the user via the switch actuation unit 212 and touch panel 215 and causes operations corresponding to the entries to be executed.

The writing and reading of data to/from the memory card A 220, memory card B 223, and built-in memory 224 is carried out based on a predefined file system (data file management structure). The main control unit 210 has software (drivers) used for this type of data management. The firmware and settings etc. of the digital video camera 100 are written to the EEPROM 211, which is a rewritable ROM.

An EVF (Electronic View Finder) 214, which is a display device, is used to check the imaging range of the digital video camera 100. A liquid crystal display (LCD) panel 216, which is a display device that is larger than the EVF 214, is used for displaying menu screens, etc. It should be noted that the LCD panel 216 can be operated as an EVF. The LCD panel 216 is provided with a touch panel 215, thereby allowing the user to enter menu actions and various instructions by directly manipulating a GUI displayed on the LCD panel 216 with a finger, etc.

A screen control unit 222 computes the location of entries via the touch panel 215 and determines the contents of the entries based on a relationship to the image displayed on the LCD panel 216. Furthermore, the screen control unit 222 also exercises display control over virtual buttons (GUI) displayed on the LCD panel 216.

Here, relay recording without using the built-in memory 224 will be described with reference to FIG. 2A and FIG. 2B. FIG. 2A illustrates a situation, in which the order of the recording media used for relay recording is set to slot 1 (memory card A 220)→slot 2 (memory card B 223). Recording is initiated by designating the memory card A 220 as the destination of recording and, when its recordable capacity drops below a threshold value (e.g. if the threshold value is 0, when no more recordable capacity is available), the recording medium used for recording is switched from the memory card A 220 to the memory card B 223, and recording is continued.

If neither the memory card A 220 nor the memory card B 223 has a wireless communication function, relay recording may be carried out without any particular problems by changing the destination of recording in the order illustrated in FIG. 2A. However, a problem does arise when, for example, the memory card B 223 has a wireless communication function. This problem will be described with reference to FIG. 2B. FIG. 2B illustrates a case, in which relay recording similar to that of FIG. 2A is performed if the memory card B 223 is a memory card provided with a wireless communication function. In this case, no particular problems arise in connection with the relay recording itself. However, at least upon completion of recording on the memory card B 223, once the memory card B 223 is placed in communication with a wireless network, the memory card B 223 automatically transfers the recorded data to a preset transfer destination (a user PC, a server on a network, etc.). In other words, in the sequence of relay-recorded content segments, only the segment recorded on the memory card B 223 ends up being wirelessly transferred to the server. No approaches to addressing such problems have been investigated in the past.

FIG. 3 illustrates an example of management information recorded on the memory cards when relay recording is performed in the digital video camera 100 of the present embodiment first on the memory card A 220 and, after that, on the memory card B 223.

The content management information 401 is recorded on the memory card A 220 and the content management information 402 is recorded on the memory card B 223. Items such as memory card content ID, recording date and time, starting position, recording length, capacity, and the like represent information on the data recorded on each memory card. In addition, relay IDs represent information that indicates whether or not content corresponding to this content ID is subsequently recorded on the next recording medium. If no relay recording is performed (in other words, if recording ends with the memory card A 220), for example, "0" is recorded in a relay ID. On the other hand, if relay recording is performed, both information that identifies the recording medium on which the subsequent material and information identifies the content ID are recorded in a relay ID. Examples of recording medium-identifying information may include specific information, such as a memory card ID, etc. Whenever a content data file is recorded on a recording medium, the main control unit 210 generates content management information regarding its content and records it on the recording medium, on which the content data file is recorded.

When content is relay-recorded from the memory card A 220 to the memory card B 223, first of all, the main control unit 210 records the memory card ID of the memory card B 223, which is the next recording destination, in the relay ID of the content management information 401 of the memory card A 220. Next, as it starts recording data relating to the same content on the memory card B 223, the main control unit 210 generates content management information 402. The main control unit 210 then adds the content ID of the content management information 402 to the relay ID of the content management information 401 of the memory card A 220. As a result, the memory card ID of the memory card B 223, i.e. the next destination of relay recording, and the content ID recorded on the memory card B 223 are recorded in the relay ID of the content management information 401.

Figure 4:
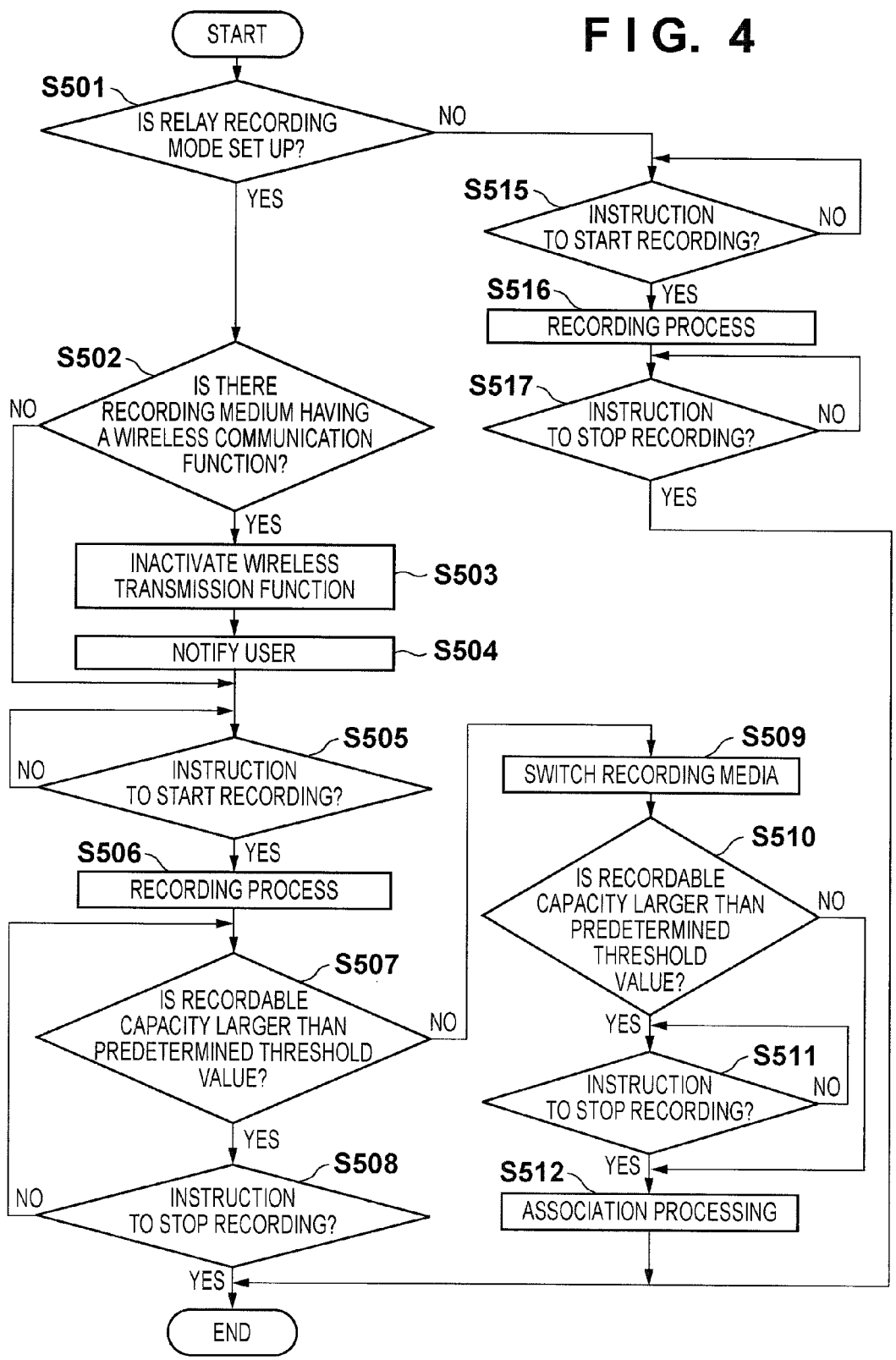
FIG. 4 is a flowchart used to describe the operation of recording performed in the digital video camera used in Embodiment 1 of the present invention.

Next, the operation of recording performed in the digital video camera 100 of the present embodiment will be described with reference to the flowchart of FIG. 4.

It should be noted that the order, in which the recording media are used here (recording order) during relay recording is assumed to be preset. In addition, the recording order may be set via user operations, or alternatively, the main control unit 210 may automatically set the order when setting up the relay recording mode for performing relay recording on media with a large recordable capacity. It should be noted that the user may be allowed to set rules for the automatic setup of the recording order.

In addition, here, the digital video camera 100 is in a recording stand-by state. In the recording stand-by state, the camera unit 200 continuously performs preview imaging, with the EVF 214 and LCD panel 216 operating as viewfinders.

In S501, for example, by referring to the EEPROM 211, the main control unit 210 determines whether the relay recording mode is set up. If relay recording is not set up, in S515, the main control unit 210 determines whether an instruction to start recording has been issued as a result of actuation of the touch panel 215 or the Start Recording key provided in the switch actuation unit 212.

Upon detection of an instruction to start recording, in S516, the main control unit 210 initiates a recording process. During the recording process, images captured by the camera unit 200 are recorded on a recording medium through the encoder unit 202 and recording circuit unit 221. Here, the recording medium used for recording is a preset recording medium selected from the memory card A 220 and memory card B 223 (for example, the recording medium that has just been used for recording).

Wireless transmission is authorized if the recording medium intended for recording has a wireless communication function and the wireless communication function of this recording medium is enabled. Once the wireless transmission unit provided in the recording medium, not shown, is placed in communication with a preset wireless communication network (or a preset apparatus), it initiates a wireless transfer of the recorded data. It should be noted that no data is transferred if the wireless communication function is not enabled.

In S517, the main control unit 210 determines whether an instruction to stop recording has been issued as a result of actuation of the touch panel 215 or the Stop Recording key provided in the switch actuation unit 212. Upon detection of an instruction to stop recording, the main control unit 210 terminates the recording operation of FIG. 4.

On the other hand, processing advances to S502 if in S501 it is determined that the relay recording mode is set up. In S502, the main control unit 210 identifies any medium having a wireless communication function present among the recording media installed in the digital video camera 100 (in this embodiment, the memory card A 220 and memory card B 223). Specifically, the main control unit 210 acquires the results of a determination made by the function detection unit 301 of the recording circuit unit 221. As described above, the function detection unit 301 can identify the presence or absence of a wireless communication function on a memory card by referring to a memory card ID.

In S502, if none of the recording media (memory card A 220, memory card B 223) is identified as having a wireless communication function, the main control unit 210 advances processing to S505, and if at least one recording media having a wireless communication function is identified, then it advances processing to S503.

In S503, the main control unit 210 inactivates the wireless transmission unit of each recording medium having a wireless communication function. While the main control unit 210 can inactivate the wireless communication function of the recording medium having a wireless communication function e.g. by turning off the power supply of the wireless transmission unit of this recording medium through the wireless control unit 302, other methods may also be used. For example, a method may be used wherein setup parameters held by the recording medium (flags or values used to set the active/inactive status of the wireless transmission unit) are changed to values inactivating the wireless transmission unit through the wireless control unit 302. It should be noted that this process is performed even if the wireless communication function is enabled in advance via user actuation.

Subsequently, in S504, the main control unit 210 notifies the user of the fact that communication utilizing the wireless communication function of the recording medium will not be performed. Although there is no particular limitations concerning the method of notification, a notification based on displaying a message on the LCD panel 216 or outputting an audio message from speakers (which may be connected, e.g. to the decoder unit 208) is anticipated. In addition, a confirmatory entry to verify the inactivation of the wireless communication function may be requested from the user. If a confirmatory entry is obtained, for example, from the switch actuation unit 212, the main control unit 210 advances processing to S505. It should be noted that, upon outputting the notification message, the main control unit 210 may automatically advance processing to S505 after the lapse of a certain period.

In S505, the main control unit 210 determines whether an instruction to start recording has been issued as a result of actuation of the touch panel 215 or the Start Recording key provided in the switch actuation unit 212.

Upon detection of an instruction to start recording, in S506, the main control unit 210 initiates a recording process. Here, the initial recording medium destined for recording is the first recording medium in the preset recording order. At the start of the recording process, the main control unit 210 generates content management information (FIG. 3) and writes it to the recording medium (or to the memory 206).

In S507, the main control unit 210 determines whether the recordable capacity of the recording medium undergoing recording (which may also be available recording length or free space) is larger than or equal to a predetermined threshold value. If the recordable capacity of the recording medium undergoing recording is larger than or equal to a predetermined threshold value, in S508, the main control unit 210 determines whether an instruction to stop recording has been issued as a result of actuation of the touch panel 215 or the Stop Recording key provided in the switch actuation unit 212. Upon detection of an instruction to stop recording, the main control unit 210 terminates the recording operation of FIG. 4. It should be noted that if an instruction to stop recording is detected in S508, the main control unit 210 may delete the content management information recorded in 5506 because no actual relay recording is performed.

If it is determined in S507 that the recordable capacity of the recording medium undergoing recording is below the predetermined threshold value, then, in S509, the main control unit 210 uses the media switching unit 303 to switch the recording medium used for recording to the next recording medium, for which the recording order has been set, and continues recording. It should be noted that in a situation where no media can be used, such as when the next recording medium, for which the recording order has been set, has not been installed, or when the recordable capacity is below a predetermined threshold value, etc., the main control unit 210 terminates the recording operation of FIG. 4. In the same manner as upon detection of an instruction to stop recording in S508, in this case, the main control unit 210 may also delete the content management information recorded in S506 because no actual relay recording is performed.

In S510, the main control unit 210 determines whether the recordable capacity of the recording medium undergoing recording (which may also be available recording time or free space) is larger than or equal to a predetermined threshold value. If the recordable capacity of the recording medium undergoing recording is larger than or equal to a predetermined threshold value, in S511, the main control unit 210 determines whether an instruction to stop recording has been issued as a result of actuation of the touch panel 215 or the Stop Recording key provided in the switch actuation unit 212. Upon detection of an instruction to stop recording in S511, the main control unit 210 terminates the recording process and advances processing to S512. If it is determined in S510 that the recordable capacity of the recording medium undergoing recording is below a predetermined threshold value, the main control unit 210 terminates the recording process and advances processing to S512.

In S512, the main control unit 210 carries out association processing. The association processing consists of updating the content management information 401, 402 described above with reference to FIG. 3. The recording length, capacity, relay IDs, etc. are updated upon termination of recording. If the content management information 401, 402 is written to the memory 206, updated content management information 401 is written to the recording medium. Upon termination of the association processing, the main control unit 210 terminates the recording operation of FIG. 4.

As described above, in the present embodiment, the wireless communication function of the recording media having a wireless communication function is inactivated when relay recording is performed on multiple recording media. As a result, the portion of the same relay-recorded content recorded on the recording medium having a wireless communication function can be prevented from being transferred on its own.

(Embodiment 2)

The operation of relay recording in the information recording apparatus of the second embodiment of the present invention will be described next. It should be noted that the information recording apparatus used in the present embodiment may be identical to the one used in Embodiment 1 with the exception of processing that takes place when the initial recording medium used for relay recording has a wireless communication function. Therefore, recording is assumed to be carried out using the digital video camera 100 described in Embodiment 1, and the description will focus on the points of difference from the recording operation of Embodiment 1.

Figure 5A:
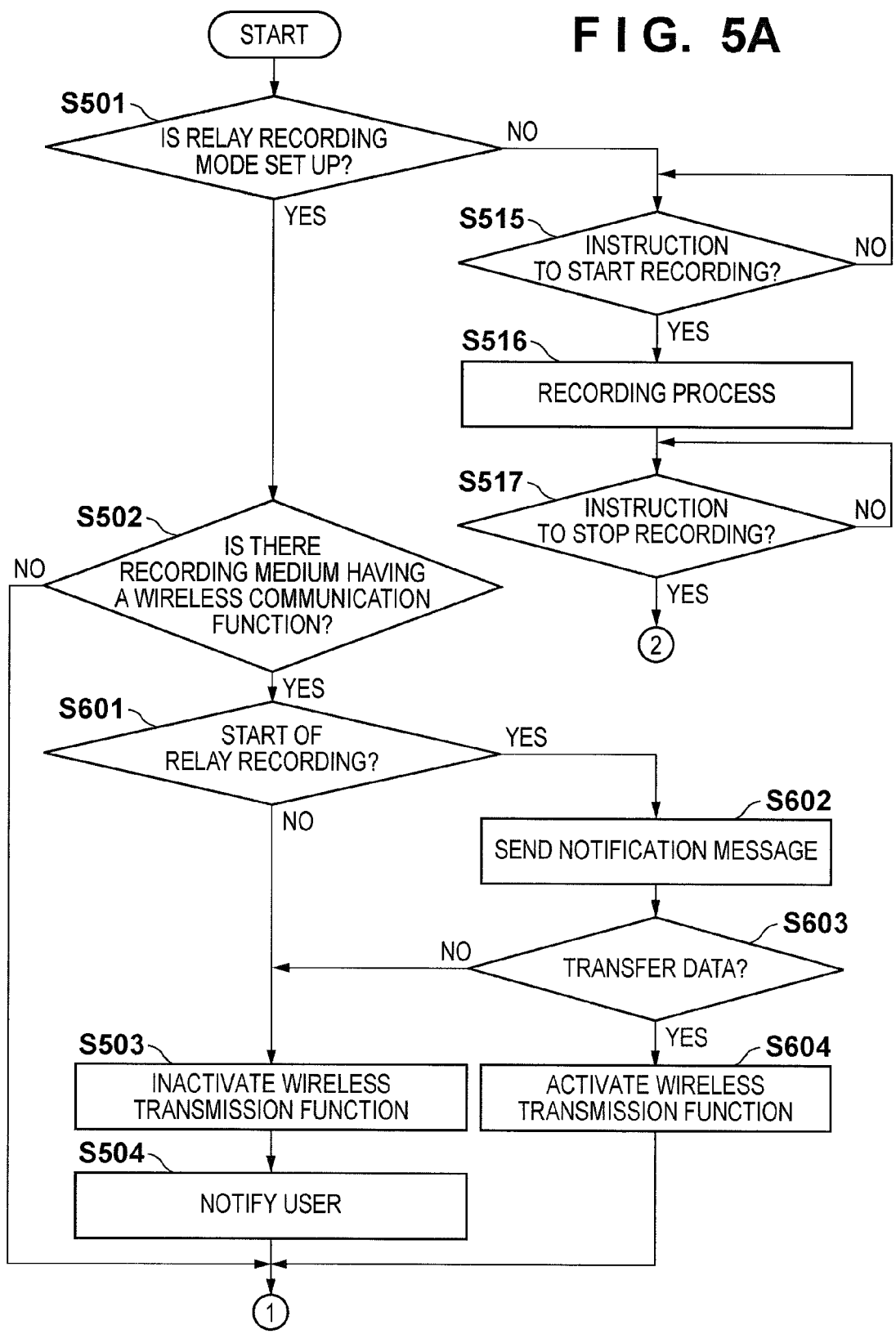

The operation of recording carried out in the digital video camera 100 of the present embodiment will be described with reference to the flowchart of FIGS. 5A and 5B. In FIGS. 5A and 5B, the same reference numerals are assigned to the same steps as in FIG. 4.

In S502, if no recording medium having a wireless communication function is identified, in S601, the main control unit 210 determines whether the initial recording medium to be used (at the start of the recording order) is a recording medium having a wireless communication function. If the recording medium at the start of the recording order has a wireless communication function, in S602, the main control unit 210 asks (S602) the user whether to carry out data communication utilizing the wireless communication function of this recording medium.

Specifically, the main control unit 210 displays an inquiry message such as "Activate wireless communication function of first recording medium used for relay recording?" on the LCD panel 216 along with the GUI buttons "Yes" and "No". The main control unit 210 then determines (S603) whether a user instruction indicating either "Yes" or "No" is entered via the touch panel 215 or the switch actuation unit 212.

If a user instruction to activate the wireless communication function of the initial recording medium used for relay recording is entered, in S604, the main control unit 210 activates the wireless communication function of this recording medium through the wireless control unit 302. It should be noted that this step is not carried out if the wireless communication function is already activated. On the other hand, if in S601 it is determined that the initial recording medium in the recording order does not have a wireless communication function, or if a user instruction to not activate the wireless communication function of the initial recording medium is entered in S603, the main control unit 210 advances processing to S503. The main control unit 210 then inactivates the wireless communication function through the wireless control unit 302. It will be noted that this step is not carried out if the wireless communication function is already inactivated.

The rest of the processing is similar to the first embodiment and its description is therefore omitted.

As explained above, in the present embodiment, when the initial recording medium used for relay recording has a wireless communication function, this wireless communication function can be activated if there is an explicit user instruction. This is done because it is believed that the user may wish to transmit the recorded content, or a portion of it, if the initial recording medium used for relay recording by the user is provided with a wireless communication function. The present embodiment is enabled to receive user instructions and perform flexible relay recording with account taken of user intent. It should be noted that the user is believed unlikely to have an affirmative intent to transmit the recorded content if the initial recording medium used for relay recording does not have a wireless communication function. Accordingly, when the initially recorded recording medium does not have a wireless communication function and the second or subsequent recording media have a wireless communication function, the user is not asked about the use of the wireless communication function.

It should be noted that it can be determined in S601 whether or not the wireless communication function of the initial recording medium used for relay recording is activated. In such a case, the message of S602 is displayed if it is active, and processing is advanced to S505 if it is inactive. This is due to the fact that the user is believed unlikely to have an affirmative intent to transmit the recorded content even if the initial recording medium does have a wireless communication function, but at the same time, this wireless. communication function is rendered inactive.

(Embodiment 3)

A third embodiment of the present invention will be described next. The present embodiment is characterized by controlling the order of the recording media used during relay recording in accordance with the type of the recording media. Just like in Embodiments 1 and 2, the digital video camera 100 of the present embodiment is assumed to have the configuration depicted in FIG. 1. However, the present embodiment uses the built-in memory 224.

Figure 6A:
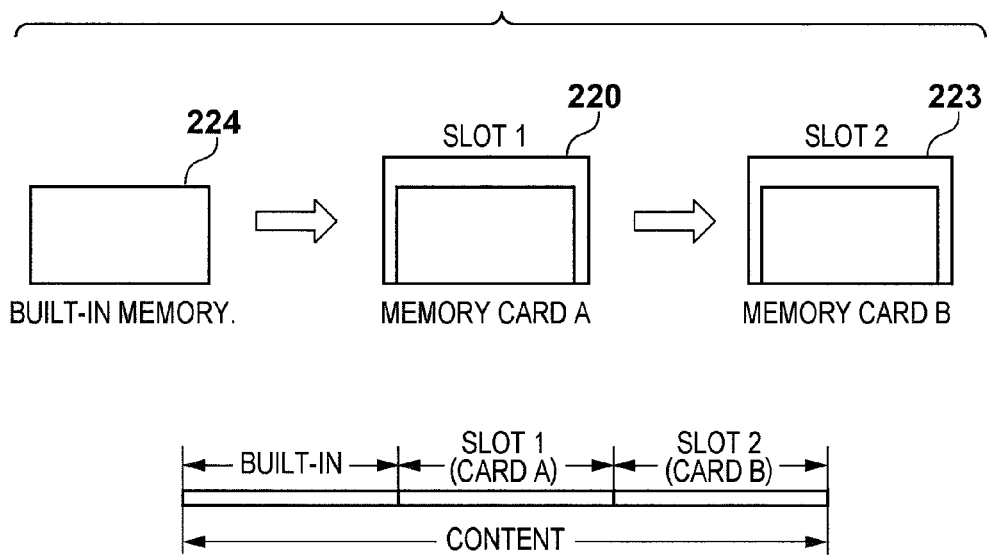
FIGS. 6A and 6B are schematic diagrams used to describe relay recording.
Figure 6B:
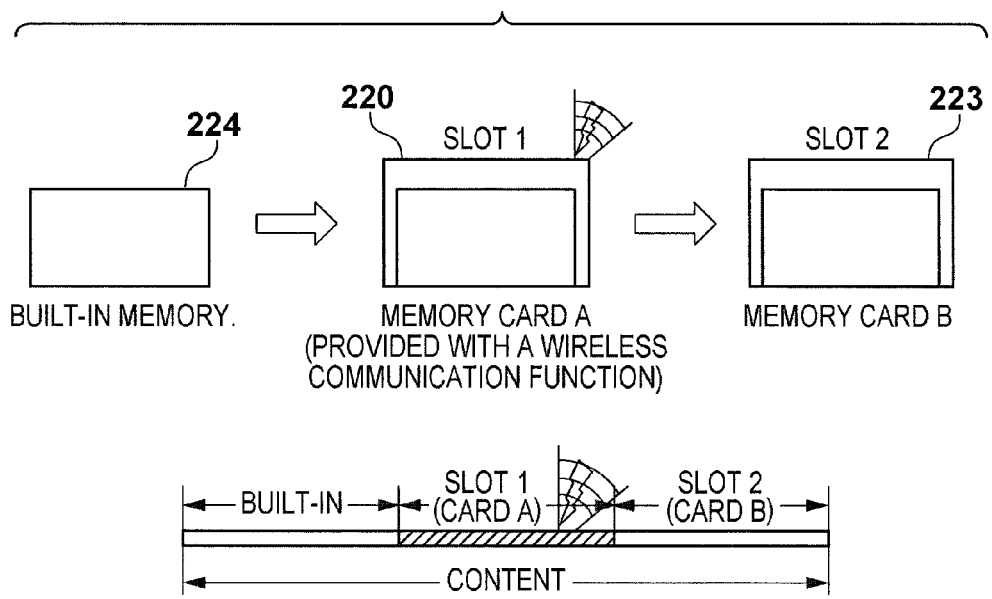

First of all, relay recording performed with the help of the built-in memory 224 will be described with reference to FIG. 6A and FIG. 6B. FIG. 6A illustrates a situation, in which the order of the recording media used for relay recording is set to built-in memory 224→slot 1 (memory card A 220)→slot 2 (memory card B 223). Recording is initiated by designating the built-in memory 224 as the destination of recording and, when its recordable capacity drops below a threshold value (e.g. if the threshold value is 0, when no more recordable capacity is available), the recording medium used for recording is switched from the built-in memory 224 to the memory card A 220, and recording is continued. When the recordable capacity of the memory card A 220 drops below a threshold value, the recording medium used for recording is switched from the memory card A 220 to the memory card B 223, and recording is continued.

If neither the memory card A 220 nor the memory card B 223 has a wireless communication function, relay recording may be carried out without any particular problems by changing the destination of recording in the order illustrated in FIG. 6A. However, a problem does arise when, for example, the memory card A 220 has a wireless communication function. This problem will be described with reference to FIG. 6B. FIG. 6B illustrates a case, in which relay recording similar to that of FIG. 6A is performed if the memory card A 220 is a memory card provided with a wireless communication function. In this case, no particular problems arise in connection with the relay recording itself. However, at least upon completion of recording on the memory card A 220, once the memory card A 220 is placed in communication with a wireless network, the memory card A 220 automatically transfers the recorded data to a preset transfer destination (a user PC, a server on a network, etc.). In other words, in the sequence of relay-recorded content segments, only the segment recorded on the memory card A 220 ends up being wirelessly transferred to the server. No approaches to addressing such problems have been investigated in the past.

Figure 7:
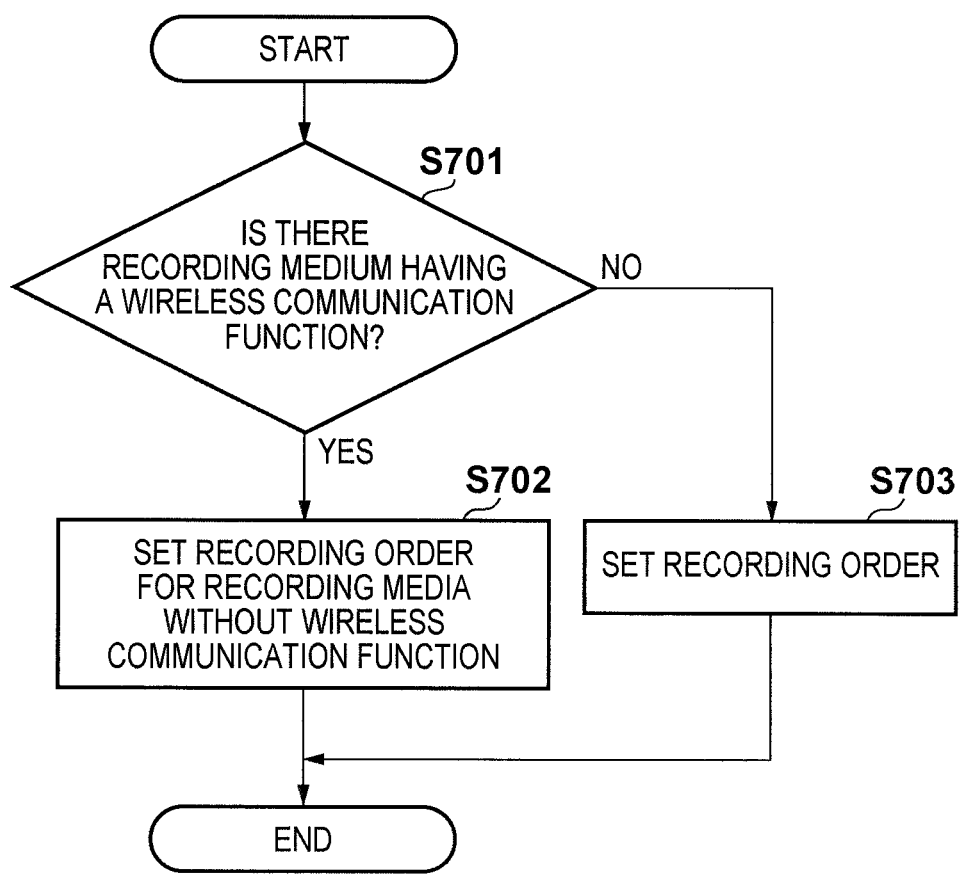
FIG. 7 is a flowchart used to describe the operation of setting the recording order used when performing relay recording in the digital video camera employed in Embodiment 3 of the present invention.

The operation of setting the order of recording used during relay recording in the digital video camera 100 of the present embodiment will be described with reference to the flowchart of FIG. 7. This operation is carried out when the relay recording mode has been set or when a memory card is inserted and removed in a situation, wherein the relay recording mode has been set.

In S701, the main control unit 210 identifies a recording medium having a wireless communication function among the recording media installed in the digital video camera 100 (in this embodiment, the memory card A 220 and memory card B 223). Specifically, the main control unit 210 acquires the results of a determination made by the function detection unit 301 of the recording circuit unit 221. As described above, the function detection unit 301 can identify the presence or absence of a wireless communication function on a memory card by referring to a memory card ID.

In S701, if no recording media from among the recording media (memory card A 220, memory card B 223, built-in memory 224) is identified as having a wireless communication function, the main control unit 210 advances processing to S703, and if at least one of the recording media is identified as a recording medium having a wireless communication function, then it advances processing to S702.

In S702, the main control unit 210 sets up relay recording only on recording media without a wireless communication function. For example, the main control unit 210 sets up the order such that relay recording is carried out starting from the media that have a larger recordable capacity among the recording media that do not have a wireless communication function. The recording media that have a wireless communication function are not included in the media subject to relay recording. Alternatively, the recording media that do not have a wireless communication function may be displayed on the LCD panel 216 and the user may be allowed to set the order of relay recording.

In S703, the main control unit sets the order of relay recording, e.g. in accordance with user settings. Alternatively, if no settings defining an explicit order are obtained from the user, the main control unit 210 may set the recording order by a predefined method, e.g. by setting the order such that relay recording is performed starting from media with larger recordable capacities, etc.

Figure 8:
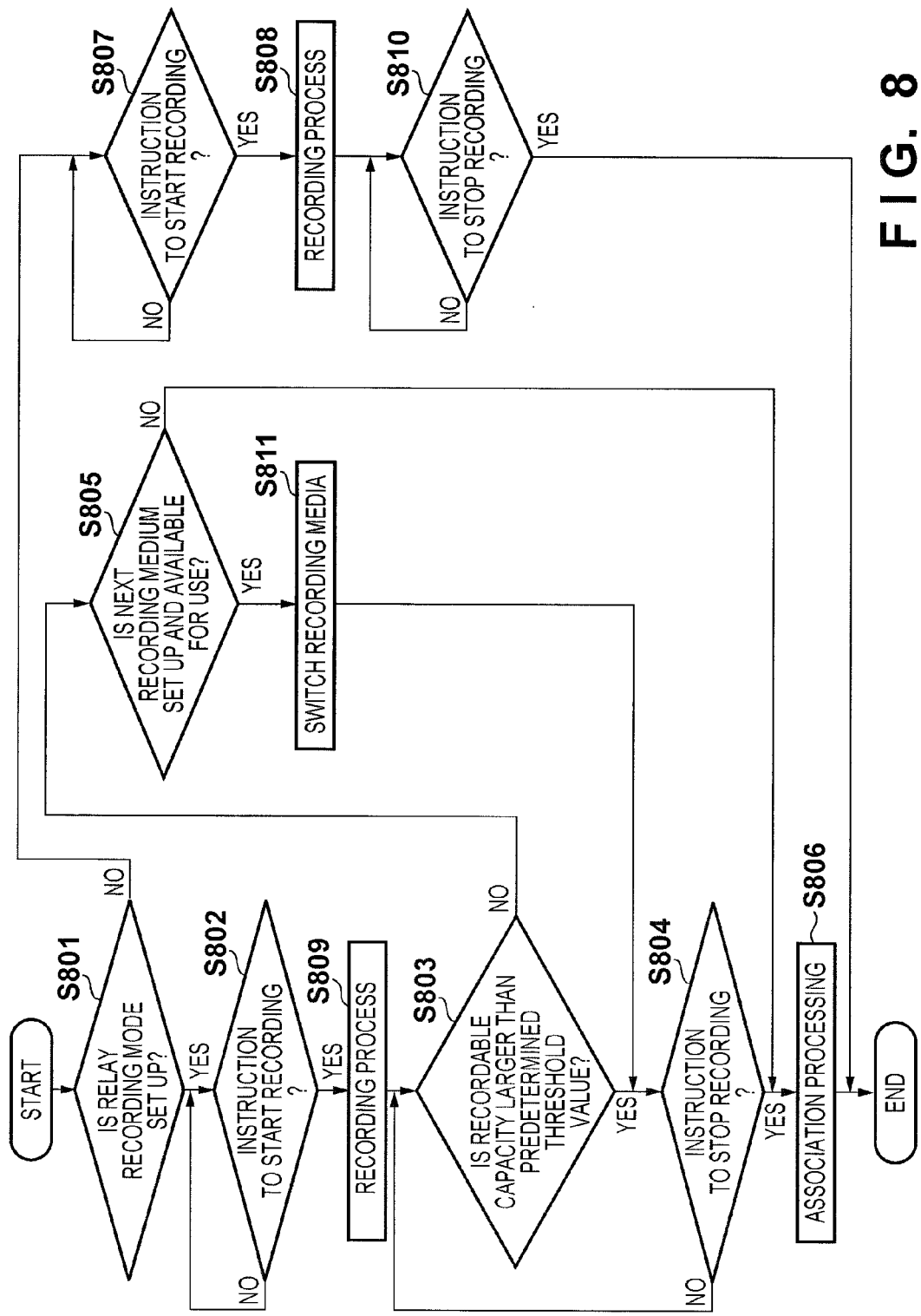
FIG. 8 is a flowchart used to describe recording operation that takes place when relay recording is performed in the digital video camera employed in Embodiment 3 of the present invention.

Next, the operation of the digital video camera 100 of the present embodiment during relay recording will be described with reference to the flowchart of FIG. 8. It should be noted that here the digital video camera 100 is in a recording stand-by state. In the recording stand-by state, the camera unit 200 continuously performs preview imaging, with the EVF 214 and LCD panel 216 operating as viewfinders.

In S801, for example, by referring to the EEPROM 211, the main control unit 210 determines whether the relay recording mode has been set. If no relay recording has been set up, in S807, the main control unit 210 determines whether an instruction to start recording has been issued as a result of actuation of the touch panel 215 or the Start Recording key provided in the switch actuation unit 212.

Upon detection of an instruction to start recording, the main control unit 210 initiates a recording process in S808. During the recording process, images captured by the camera unit 200 are recorded on a recording medium via the encoder unit 202 and recording circuit unit 221. Here, the recording medium used for recording is a preset recording medium selected from the memory card A 220, memory card B 223, and built-in memory 224 (for example, the recording medium that has just been used for recording).

If the recording medium intended for recording has a wireless communication function, the wireless control unit 302 turns on the wireless transmission unit of the recording medium and authorizes a wireless transmission. Once the wireless transmission unit, not shown, is placed in communication with a preset wireless communication network, it initiates a wireless transfer of the recorded data.

In S810, the main control unit 210 determines whether an instruction to stop recording has been issued as a result of actuation of the touch panel 215 or the Stop Recording key provided in the switch actuation unit 212. Upon detection of an instruction to stop recording, the main control unit 210 terminates the recording process.

On the other hand, if it is determined in S801 that the relay recording mode has been set up, in S802, the main control unit 210 determines whether an instruction to start recording has been issued as a result of actuation of the touch panel 215 or the Start Recording key provided in the switch actuation unit 212.

Upon detection of an instruction to start recording, the main control unit 210 initiates a recording process in S809. Here, as described above, the initial recording medium destined for recording is the recording medium of the highest recordable capacity among the recording media that do not have a wireless communication function. At the start of the recording process, the main control unit 210 generates content management information (FIG. 3) and writes it to the recording medium (or to the memory 206).

In S803, the main control unit 210 determines whether the recordable capacity of the recording medium undergoing recording (which may also be available recording time or free space) is larger than or equal to a predetermined threshold value. If the recordable capacity of the recording medium undergoing recording is larger than or equal to a predetermined threshold value, in S804, the main control unit 210 determines whether an instruction to stop recording has been issued as a result of actuation of the touch panel 215 or the Stop Recording key provided in the switch actuation unit 212. Upon detection of an instruction to stop recording, the main control unit 210 terminates the recording process.

If it is determined in S803 that the recordable capacity of the recording medium undergoing recording is below a predetermined threshold value, then in S805 the main control unit 210 determines if the next recording medium has been set up. If the next recording medium in the recording order has been set up and, at the same time, this recording medium has been installed, the main control unit 210 determines that the next recording medium has been set up and is available for use and advances processing to S811. In S811, the main control unit 210 continues recording by using the media switching unit 303 to switch the recording medium intended for recording to the next recording medium, for which the recording order has been set, and returns processing to S804.

On the other hand, if it is determined in S805 that the next recording medium in the recording order does not exist or if the next recording medium in the recording order has not been installed, the main control unit 210 terminates the recording process and advances processing to S806.

In S806, the main control unit 210 carries out association processing. The association processing consists of updating the content management information 401, 402 described above with reference to FIG. 3. The recording time, capacity, relay IDs, etc. are updated upon termination of recording. If the content management information 401, 402 is written to the memory 206, updated content management information 401 is written to the recording medium.

As described above, in the present embodiment, only recording media that do not have a wireless communication function are used when relay recording is performed on multiple recording media. As a result, the portion of the same relay-recorded content recorded on the recording medium having a wireless communication function can be prevented from being transferred on its own.

(Embodiment 4)

The operation of relay recording in the information recording apparatus used in the fourth embodiment of the present invention will be described next. It should be noted that since the information recording apparatus according to the present embodiment is similar to that of Embodiment 3 with the exception of the contents of the relay recording operation, the description assumes that recording is carried out using the digital video camera 100 described in Embodiment 3.

Figure 9:
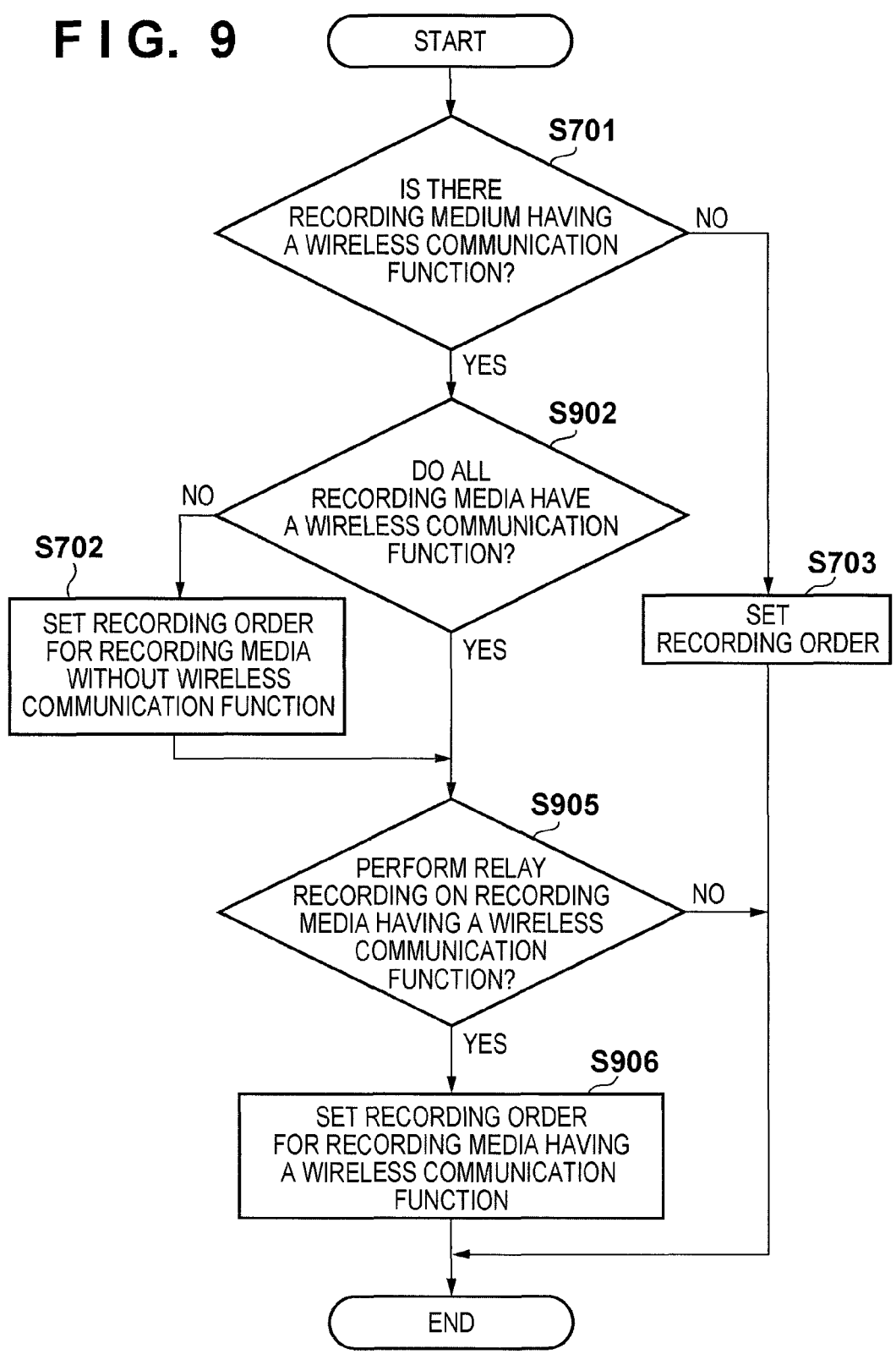
FIG. 9 is a flowchart used to describe the operation of setting the recording order used when performing relay recording in the digital video camera employed in Embodiment 4 of the present invention.

First of all, the operation of setting the order of recording used for relay recording in the digital video camera 100 of the present embodiment will be described with reference to the flowchart of FIG. 9. In FIG. 9, the same reference numerals are assigned to the same steps as in FIG. 7.

In S701, the main control unit 210 identifies any recording medium having a wireless communication function among the recording media installed in the digital video camera 100 (in this embodiment, the memory card A 220 and memory card B 223). If no recording media (memory card A 220, memory card B 223) is identified as a recording medium having a wireless communication function, the main control unit 210 advances processing to S703, and if there is a recording medium having a wireless communication function, it advances processing to S902.

In S703, the main control unit sets the order of relay recording, e.g. in accordance with user settings. Alternatively, if no settings defining an explicit order are obtained from the user, the main control unit 210 may set the recording order by a predefined method, e.g. by setting the order such that relay recording is performed starting from media with a larger recordable capacity, etc.

In S902, the main control unit 210 determines if all the recording media are identified as a recording medium having a wireless communication function. If there is a recording medium without a wireless communication function, it advances processing to S702, and if all the recording media have a wireless communication function, it advances processing to S905.

In S702, the main control unit 210 sets up relay recording only on the recording media without a wireless communication function. For example, the main control unit 210 sets up the order such that relay recording is carried out starting from the media that have a larger recordable capacity among the, recording media that do not have a wireless communication function. The recording media that have a wireless communication function are not included in the media subject to relay recording. Alternatively, the recording media that do not have a wireless communication function may be displayed on the LCD panel 216 and the user may be allowed to set the order of relay recording. Once the recording order for the recording media that do not have a wireless communication function is set, the main control unit 210 advances processing to S905.

In S905, the main control unit 210 asks the user whether to perform relay recording on the recording media having a wireless communication function, for example, by displaying an inquiry message and GUI buttons on the LCD panel 216. The user can provide instructions as to whether recording media having a wireless communication function should be used for relay recording by operating the touch panel 215 and pressing the GUI buttons. It should be noted that other methods may be used as the method of making inquiries and providing user instructions.

In S905, the main control unit 210 terminates processing if an instruction has been entered to not perform relay recording on recording media having a wireless communication function. In this case, in accordance with the setting of S702, relay recording is performed only on the recording media without a wireless communication function.

On the one hand, if it is determined in S905 that an instruction has been entered to perform relay recording on recording media having a wireless communication function, in S906, the main control unit 210 sets the recording order of relay recording on recording media having a wireless communication function. If the recording order for the recording media that do not have a wireless communication function has been set in S702, the main control unit 210 sets the order of recording to a point later than that of any of the recording media that do not have a wireless communication function. As a result, relay recording is performed on the recording media having a wireless communication function upon termination of recording on all the recording media (whose recording order has been set) without a wireless communication function. As described above, even if relay recording has been set up for media having a wireless communication function, the recording order used during relay recording is set with a preference for recording media that do not have a wireless communication function.

Figure 10:
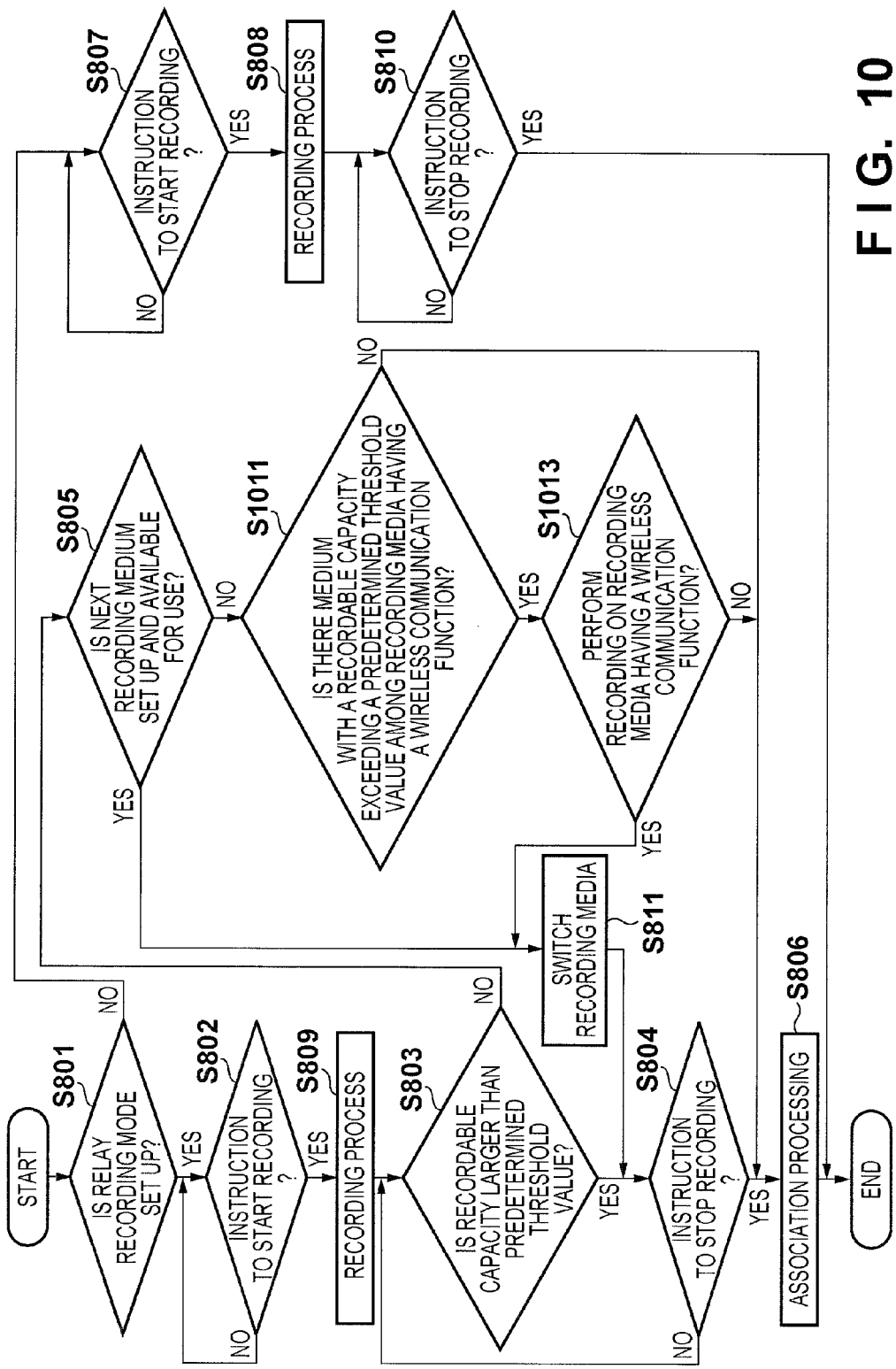
FIG. 10 is a flowchart used to describe recording operation that takes place when relay recording is performed in the digital video camera used in Embodiment 4 of the present invention.

Next, the operation of the digital video camera 100 of the present embodiment during relay recording will be described with reference to the flowchart of FIG. 10. In FIG. 10, the same steps as in FIG. 8 are assigned the same reference numerals and their description is omitted.

In S805, the main control unit 210 determines whether the next recording medium for use in relay recording has been set up. If the next recording medium, for which the recording order has been set, exists and, at the same time, this recording medium has been installed, the main control unit 210 determines that the next recording medium has been set and advances processing to S811. In S811, the main control unit 210 continues recording by using the media switching unit 303 to switch the recording medium intended for recording to the next recording medium, for which the recording order has been set, and returns processing to S804. It should be noted that if a recording order has been set up for recording media having a wireless communication function, relay recording on the recording media having a wireless communication function is initiated when the recordable capacity of all the recording media that do not have a wireless communication function and have a recording order set up therefor drops below a predetermined threshold value.

In addition, even if a recording order has been set up for the recording media having a wireless communication function, the invention can be adapted to check with the user if recording should be continued when a switch to the recording media having a wireless communication function takes place. In such a case, the timing of the display of the confirmatory message is set so as allow for the check to be completed before the end of recording on the recording media without a wireless communication function, on which recording is performed immediately prior to switching to the recording media that have a wireless communication function.

In addition, in order to avoid an interruption of recording due to the time lag between S803 and the switch in S811, the recording medium switch in S811 may be adapted to be carried out when the recordable capacity of the recording medium undergoing recording reaches a switching threshold value that is smaller than the above-mentioned predetermined threshold value. Alternatively, processing intended to check for the existence of the next recording medium in S805 may be executed at an appropriate moment in time when the recordable capacity of the recording medium undergoing recording is larger than or equal to a predetermined threshold value and the recording medium may be switched at the point in time when the recordable capacity of the recording medium undergoing recording reaches the predetermined threshold value.

On the other hand, if it is determined in S805 that the next recording medium, for which the recording order has been set, does not exist, or if the next recording medium in the recording order has not been installed, the main control unit 210 advances processing to S1011.

In S1011, the main control unit 210 checks whether there is no media with a recordable capacity higher than a predetermined threshold value in the recording media having a wireless communication function among the built-in recording media provided in, or recording media installed in, the digital video camera 100. If there is no media whose recordable capacity exceeds the predetermined threshold value among the recording media having a wireless communication function, the main control unit 210 terminates recording and advances processing to S806.

If there is a medium whose recordable capacity exceeds the predetermined threshold value among the recording media having a wireless communication function, then, in S1013, the main control unit 210 asks the user whether relay recording should be continued using this recording medium. It should be noted that S1013 is executed if no recording media having a wireless communication function was set up as the destination of recording when setting the relay recording order.

Inquiries are made, for example, by displaying a GUI used for entering instructions and messages such as "Continue recording using recording media equipped with wireless communication function?" or "Only part of the video can be wirelessly transferred. Continue recording?" on the LCD panel 216. Once an instruction to continue recording on the recording media having a wireless communication function is entered by the user via the switch actuation unit 212 or touch panel 215, in S811, the main control unit 210 uses the media switching unit 303 to switch the recording medium intended for recording and continues recording.

It should be noted that, as explained in Embodiment 3, the timing of execution of S805, S1011, and S1013 is taken into account in order avoid an interruption of recording due to the time lag between S803 and the switch in S811. Specifically, S1013, during which the apparatus waits for a decision by the user, is executed at a point in time when the recordable capacity of the recording medium undergoing recording is sufficiently larger than the predetermined threshold value. In addition, when there is no instruction entered by the user within a specified time period, this can be handled as if an instruction has been entered to not use the recording media having a wireless communication function.

In S806, the main control unit 210 carries out the above-described association processing and terminates the recording process.

As explained above, in the present embodiment, recording media having a wireless communication function can be used for relay recording when there is an explicit user instruction. As a result, a longer video can be recorded, even though there is a chance that a portion of the video may be wirelessly transferred. At such time, even if recording media having a wireless communication function are used for relay recording, the recording order is set such that recording starts from recording media that do not have a wireless communication function and, therefore, the likelihood of a wireless transfer of a portion of the relay-recorded video can be reduced. In addition, allowing the user to decide whether recording media having a wireless communication function should be used for relay recording permits the user to recognize in advance that a portion of the relay-recorded video may be wirelessly transferred, thereby enabling the user to prevent an unintended wireless transfer from taking place.

Other Embodiments

In Embodiments 1 and 2, the inactivation of the wireless communication function of the recording medium was described as a way to prevent data transfer caused by the wireless communication function. However, data transfer can be prevented (namely, data transfer utilizing the wireless communication function can be inactivated) even if the wireless communication function remains in effect and the apparatus is placed in communication with a device serving as the data transfer destination. Simply put, there are no particular limitations concerning the specific methods used as long as data relay-recorded on the recording medium can be prevented from being transferred based on the wireless communication function of this recording medium.

In addition, the apparatus can be adapted to activate the wireless communication function of the recording medium if there was no actual recording spanning recording media even though recording was started in the relay recording mode. For example, if an instruction to stop recording is detected in S508 in FIG. 4, which illustrates the recording operation of Embodiment 1, the apparatus can be adapted to automatically re-activate the wireless communication function inactivated in S503. As a result, it becomes possible to avoid inactivating the wireless communication function even when it is not necessary, thereby making it possible to take advantage of recording media having a wireless communication function.

Alternatively, if the recording medium initially used for recording in the relay recording mode had a wireless communication function and if recording ended with this recording medium, the apparatus may be adapted to automatically reactivate the wireless communication function upon completion of the recording process.

In addition, in Embodiments 1 and 2, the wireless communication function of the recording medium was inactivated prior to the start of recording. However, in some cases, depending on the size of the recorded data, recording may end before relay recording on recording media having a wireless communication function. Accordingly, the wireless communication function of the recording medium on which data will be recorded may be inactivated after determining that a relay to recording media having a wireless communication function will actually take place. Specifically, S503 (optionally, S504) is executed between S507 and S509 of FIG. 5B.

Furthermore, while Embodiments 1 and 2 described cases in which the invention was applied to an apparatus provided with two recording media that could be used as destinations for relay recording, it can be similarly applied to an apparatus capable of relay recording on three or more recording media. For example, a configuration may be adopted, in which a built-in storage device (a semiconductor memory or a magnetic recording medium, etc.) can be used for relay recording.

It should be noted that a premise used when setting the recording order in Embodiment 4 consisted of setting the recording order for all the recording media without a wireless communication function, whose recordable capacity was above a predetermined threshold value. Accordingly, a check was performed in S1011 to determine whether there were any media whose recordable capacity exceeded the predetermined threshold value among the recording media having a wireless communication function, for which a recording order had not been set. However, if during the recording order setup process the recording order was set only for specific (e.g. user-selected) recording media, in S1011, a check is performed to determine whether there is a recording medium whose recordable capacity exceeds the predetermined threshold value regardless of the presence/absence of the wireless communication function. Then, in S1013, the user is asked whether to continue relay recording on a recording medium whose recordable capacity is above the predetermined threshold value and for which no recording order has been set. Then, if there is an instruction from the user to continue relay recording using this recording medium, the apparatus switches to that recording medium and continues relay recording.

If multiple recording media whose recordable capacity exceeds the predetermined threshold value are found in S1011, in S1013, the user may be allowed to select the recording medium used for relay recording. In addition, if media that have a wireless communication function and media that do not are included among the multiple recording media, the user may be permitted to select the recording order, i.e. whether to set the recording order starting from the recording media that do not have a wireless communication function.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-105646, filed on May 10, 2011, and No. 2011-163686, filed on Jul. 26, 2011, which are hereby incorporated by reference herein their entirety.

What is claimed is:

1. An information recording apparatus having a relay recording mode in which a sequence of data is recorded across a plurality of recording media, comprising:

an identification unit that identifies a recording medium having a wireless communication function among recordable recording media being attached to the information recording apparatus, wherein the recording medium having the wireless communication function is capable of transmitting data to an external apparatus through the wireless communication function, the external apparatus being other than the information recording apparatus and any recording medium being attached to the information recording apparatus;

a wireless control unit that controls the wireless communication function of the recording medium having a wireless communication function; and a main control unit that controls the wireless control unit;

wherein the main control unit controls the wireless control unit, in the case that the relay recording mode is set, to inactivate data transfer utilizing the wireless communication function for the recording medium having a wireless communication function identified by the identification unit; and wherein the main control unit controls the wireless control unit, in the case that the relay recording mode is not set, not to inactivate data transfer utilizing the wireless communication function for the recording medium having a wireless communication function identified by the identification unit.

2. The information recording apparatus according to claim 1 wherein, in the case that the relay recording mode is set and a recording medium having a wireless communication function identified by the identification unit is a recording medium initially used in the relay recording mode, the main control unit does not inactivate data transfer utilizing the wireless communication function for that recording medium.

3. The information recording apparatus according to claim 1, wherein the main control unit is configured to control the wireless control unit to activate inactivated data transfer utilizing the wireless communication function in the case that recording in the relay recording mode ends without the sequence of data recorded in the relay recording mode spanning across a plurality of recording media.

4. The information recording apparatus according to claim 1, wherein the sequence of data is captured video data.

5. The information recording apparatus according to claim 1, wherein the plurality of recording media includes a plurality of memory card.

6. The information recording apparatus according to claim 1, wherein the plurality of recording media includes a memory card and a built-in memory.

7. The information recording apparatus according to claim 1 further comprising an image sensor.

8. The information recording apparatus according to claim 1, wherein the information recording apparatus is digital video camera.

9. A method for controlling an information recording apparatus having a relay recording mode in which a sequence of data is recorded across a plurality of recording media, and comprising a wireless control unit that controls any wireless communication function that the recording media are equipped with, the method comprising the steps of:

identifying a recording medium having a wireless communication function among recordable recording media being attached to the information recording apparatus, wherein the recording medium having the wireless communication function is capable of transmitting data to an external apparatus through the wireless communication function, the external apparatus being other than the information recording apparatus and any recording medium being attached to the information recording apparatus; and controlling the wireless control unit, in the case that the relay recording mode is set, to inactivate data transfer utilizing the wireless communication function for the recording medium having a wireless communication function identified in the step of identifying step, and wherein the step of controlling further controls the wireless control unit, in the case that the relay recording mode is not set, not to inactivate data transfer utilizing the wireless communication function for the recording medium having a wireless communication function identified in the step of identifying.

10. A non-transitory computer-readable recording medium which stores a program which, when run on a device, causes the device to function as each unit provided in the information recording apparatus according to claim 1.

* * * * *